US012645880B2

(12) United States Patent
Juneja et al.

(10) Patent No.: US 12,645,880 B2
(45) Date of Patent: Jun. 2, 2026

(54) MANAGEMENT SYSTEM FOR SOFTWARE INCIDENTS

(71) Applicant: Optum, Inc., Minnetonka, MN (US)

(72) Inventors: Puneet Juneja, Eden Prairie, MN (US); Hari Sankar Jayasankar Sasilekha, Fort Mill, SC (US); Pawan Sharma, New Delhi (IN)

(73) Assignee: Optum, Inc., Minnetonka, MN (US)

( * ) Notice: Subject to any disclaimer, the term of this patent is extended or adjusted under 35 U.S.C. 154(b) by 477 days.

(21) Appl. No.: 18/062,962

(22) Filed: Dec. 7, 2022

(65) Prior Publication Data

US 2024/0193367 A1 Jun. 13, 2024

(51) Int. Cl.
| | |
|---|---|
| *G06F 40/295* | (2020.01) |
| *G06F 16/31* | (2019.01) |
| *G06F 16/3332* | (2025.01) |
| *G06F 18/22* | (2023.01) |
| *G06F 18/2413* | (2023.01) |

(52) U.S. Cl.
CPC .......... *G06F 40/295* (2020.01); *G06F 16/316* (2019.01); *G06F 16/3334* (2019.01); *G06F 18/22* (2023.01); *G06F 18/24147* (2023.01)

(58) Field of Classification Search
CPC .. G06F 40/295; G06F 16/316; G06F 16/3334; G06F 18/22; G06F 18/24147
See application file for complete search history.

(56) References Cited

U.S. PATENT DOCUMENTS

| | | | |
|---|---|---|---|
| 8,910,120 B2 | 12/2014 | Srinivasa et al. | |
| 10,558,554 B2 | 2/2020 | Bhandarkar et al. | |
| 10,740,216 B1 | 8/2020 | Parent | |
| 10,891,218 B2 | 1/2021 | Champlin-Scharff et al. | |
| 11,004,005 B1 * | 5/2021 | Sirois ..................... | G06N 5/045 |
| 11,061,805 B2 | 7/2021 | Loyola et al. | |

(Continued)

OTHER PUBLICATIONS

Agrawal et al., "Developing bug severity prediction models using word2vec", International Journal of Cognitive Computing in Engineering, vol. 2, Aug. 16, 2021, pp. 104-115.

(Continued)

*Primary Examiner* — Pierre Louis Desir
*Assistant Examiner* — Keisha Y. Castillo-Torres
(74) *Attorney, Agent, or Firm* — Shumaker & Sieffert, P.A.

(57) ABSTRACT

A method comprises receiving an incident report comprising a textual description of an incident; generating a regularized incident report in which out-of-vocabulary terms in the received incident report are replaced with in-vocabulary terms; determining importance measures for a plurality of incident report terms, wherein each of the incident report terms is in the regularized incident report; generating an incident matrix in which similarity values are defined for combinations of terms in the incident report and terms in a predetermined term set; generating an incident vector based on the incident matrix and the importance measures for the terms in the incident report; applying one or more machine learning (ML) models that identify, based on the incident vector, relevant software support records and/or software modules, wherein the relevant software support records and the software modules are potentially relevant to the incident; and outputting data identifying relevant software support records and/or software modules.

17 Claims, 5 Drawing Sheets

(56)                    References Cited

U.S. PATENT DOCUMENTS

| 2017/0262858 A1* | 9/2017 | Rajaram | ............... | G06F 40/211 |
| 2019/0361760 A1* | 11/2019 | Krishnan | .............. | G06F 11/076 |
| 2020/0089765 A1* | 3/2020 | Jayaraman | ............ | G06N 3/084 |
| 2021/0397625 A1* | 12/2021 | Wan | ....................... | G06N 20/00 |

OTHER PUBLICATIONS

Du et al., "The Automatic Classification of Fault Trigger Based Bug Report", 2017 IEEE 28th International Symposium on Software Reliability Engineering Workshops, IEEE Computer Society, Oct. 23, 2017, pp. 259-265.

Lee et al., "Applying Deep Learning Based Automatic Bug Triager to Industrial Projects", Proceedings of the 2017 11th Joint Meeting on foundations of software engineering, Aug. 21, 2017, pp. 926-931.

Mahfoodh et al., "Identifying Duplicate Bug Records Using Word2Vec Prediction with Software Risk Analysis", International Journal of Computing and Digital Systems, vol. 11, No. 1, Feb. 15, 2022, pp. 763-773.

Wikipedia, "Word2vec", Wikimedia Foundation, Inc., 2022, 8 pp., Retrieved from the Internet on Sep. 13, 2022 from URL: https://en.wikipedia.org/wiki/Word2vec.

Ye et al., "From Word Embeddings To Document Similarities for Improved Information Retrieval in Software Engineering", Proceedings of the 38th international conference on software engineering, May 14, 2016, pp. 404-415.

\* cited by examiner

| Cases | w1 | w2 | w3 | KNN | LR | SVM |
|---|---|---|---|---|---|---|
| 1 | verb | otherwise | otherwise | 0.800 | 0.828 | 0.847 |
| 2 | verb | noun | otherwise | 0.824 | 0.848 | 0.861 |
| 3 | verb | noun, adjective | otherwise | 0.834 | 0.856 | 0.866 |
| 4 | verb | noun, adverb | otherwise | 0.817 | 0.834 | 0.841 |
| 5 | verb | noun, adjective, adverb | otherwise | 0.826 | 0.837 | 0.855 |
| 6 | verb, domain | otherwise | otherwise | 0.749 | 0.804 | 0.790 |
| 7 | verb, domain | noun | otherwise | 0.766 | 0.804 | 0.796 |
| 8 | verb, domain | noun, adjective | otherwise | 0.780 | 0.812 | 0.800 |
| 9 | verb, domain | noun, adverb | otherwise | 0.770 | 0.815 | 0.797 |
| 10 | verb, domain | noun, adjective, adverb | otherwise | 0.777 | 0.817 | 0.804 |

300

*500*

RECEIVE INDICENT REPORT

*502*

GENERATE REGULARIZED INCIDENT REPORT

*504*

DETERMINE IMPORTANCE MEASURES

*506*

GENERATE INCIDENT MATRIX

*508*

GENERATE INCIDENT VECTOR

*510*

APPLY ML MODELS THAT IDENTIFY RELEVANT SOFTWARE SUPPORT RECORDS AND/OR SOFTWARE MODULES

*512*

OUTPUT DATA IDENTIFYING RELEVANT SOFTWAER SUPPORT RECORDS AND/OR SOFTWARE MODULES

MANAGEMENT SYSTEM FOR SOFTWARE INCIDENTS

BACKGROUND

Software system incidents, such as software bugs, can disrupt users' ability to use software systems. For instance, software system incidents can prevent users from accessing data, cause programs to crash, prevent communication, and so on. For case of explanation, this disclosure may refer to software system incidents simply as incidents. When an incident occurs, a user may contact a support technician to report the incident. The support technician may then attempt to address the incident. The support technician typically relies on their personal knowledge of the software system and/or written documentation to determine how to address the incident.

SUMMARY

In general, this disclosure describes computer-implemented techniques for managing software system incidents. As described herein, a computing system may receive an incident report comprising a textual description of an incident. The computing system may use the incident report to automatically identify software support records that are potentially relevant to the incident. The computing system may also automatically identify software modules that are potentially relevant to the incident. As part of the process, the computing system may determine importance measures for a plurality of incident report terms. The computing system may also generate an incident matrix in which similarity values are defined for each combination of a term in the plurality of incident report terms and a term in a predetermined term set. The computing system may generate an incident vector based on the incident matrix and the importance measures for the terms in the incident report. The computing system may identify relevant software support records and/or relevant modules based on the incident vector. Identifying relevant software support records and software modules in this way may be significantly more efficient in terms of computing power and accuracy as compared to existing computing systems that rely on text-based searches of incident reports and documentation of modules.

In one aspect, this disclosure describes a method performed by a computing system, the method comprising: receiving an incident report comprising a textual description of an incident involving a software system; generating a regularized incident report in which out-of-vocabulary terms in the received incident report are replaced with in-vocabulary terms; determining importance measures for a plurality of incident report terms, wherein each of the incident report terms is in the regularized incident report; generating an incident matrix in which similarity values are defined for combinations of terms in the incident report and terms in a predetermined term set; generating an incident vector based on the incident matrix and the importance measures for the terms in the incident report; applying one or more machine learning (ML) models that identify, based on the incident vector, relevant software support records and/or software modules of the software system, wherein the relevant software support records and the software modules are potentially relevant to the incident; and outputting data identifying relevant software support records and/or software modules.

In another aspect, this disclosure describes a system comprising: a storage device configured to store an incident report comprising a textual description of an incident involving a software system; and one or more processors implemented in circuitry and configured to: receive an incident report comprising a textual description of an incident; generate a regularized incident report in which out-of-vocabulary terms in the received incident report are replaced with in-vocabulary terms; determine importance measures for a plurality of incident report terms, wherein each of the incident report terms is in the regularized incident report; generate an incident matrix in which similarity values are defined for combinations of terms in the incident report and terms in a predetermined term set; generate an incident vector based on the incident matrix and the importance measures for the terms in the incident report; apply one or more machine learning (ML) models that identify, based on the incident vector, relevant software support records and/or software modules of the software system, wherein the relevant software support records and the software modules are potentially relevant to the incident; and output data identifying relevant software support records and/or software modules.

In another aspect, this disclosure describes a non-transitory computer-readable storage medium comprising instructions that, when executed, cause one or more processors of a computing system to: receive an incident report comprising a textual description of an incident involving a software system; generate a regularized incident report in which out-of-vocabulary terms in the received incident report are replaced with in-vocabulary terms; determine importance measures for a plurality of incident report terms, wherein each of the incident report terms is in the regularized incident report; generate an incident matrix in which similarity values are defined for combinations of terms in the incident report and terms in a predetermined term set; generate an incident vector based on the incident matrix and the importance measures for the terms in the incident report; apply one or more machine learning (ML) models that identify, based on the incident vector, relevant software support records and/or software modules of the software system, wherein the relevant software support records and the software modules are potentially relevant to the incident; and output data identifying relevant software support records and/or software modules.

The details of one or more aspects of the disclosure are set forth in the accompanying drawings and the description below. Other features, objects, and advantages of the techniques described in this disclosure will be apparent from the description, drawings, and claims.

DETAILED DESCRIPTION

When incidents (such as software bugs, glitches, problems, etc.) occur in software systems, support technicians are called upon to address the incidents. If the incident cannot be resolved easily by a frontline support technician, a subject matter expert (SME) may be called upon to address the incident. A SME may have detailed knowledge of a software system and may know how incidents involving the software system have been resolved in the past. However, SMEs are frequently in short supply and have limited time. Moreover, departure of an SME may leave knowledge gaps that may slow down resolution of incidents.

This disclosure describes an incident management system (IMS) on a computer system. The IMS may act as a virtual SME. In accordance with techniques of this disclosure, the IMS may receive an incident report comprising a textual description of an incident. Additionally, the IMS may generate a regularized incident report in which out-of-vocabulary terms in the received incident report are replaced with in-vocabulary terms. The IMS may also determine importance measures for a plurality of incident report terms. Each of the incident report terms is in the regularized incident report. The IMS may generate an incident matrix in which similarity values are defined for each combination of a term in the plurality of incident report terms and a term in a predetermined term set. The incident matrix may represent semantic features of terms in the incident report. The IMS may generate an incident vector based on the incident matrix and the importance measures for the terms in the incident report. Furthermore, the IMS may apply one or more machine learning (ML) models to identify relevant software support records or relevant software modules based on the incident vector. The relevant software support records and relevant software modules are potentially relevant to the incident. The IMS may output data identifying relevant software support records and/or software modules. The techniques of this disclosure for generating incident vectors that serve as the input to the ML models may improve the accuracy of the ML models in identifying relevant software support records and/or relevant software modules because the incident vectors may take into account both word-level importance measures and semantic context.

Figure 1:
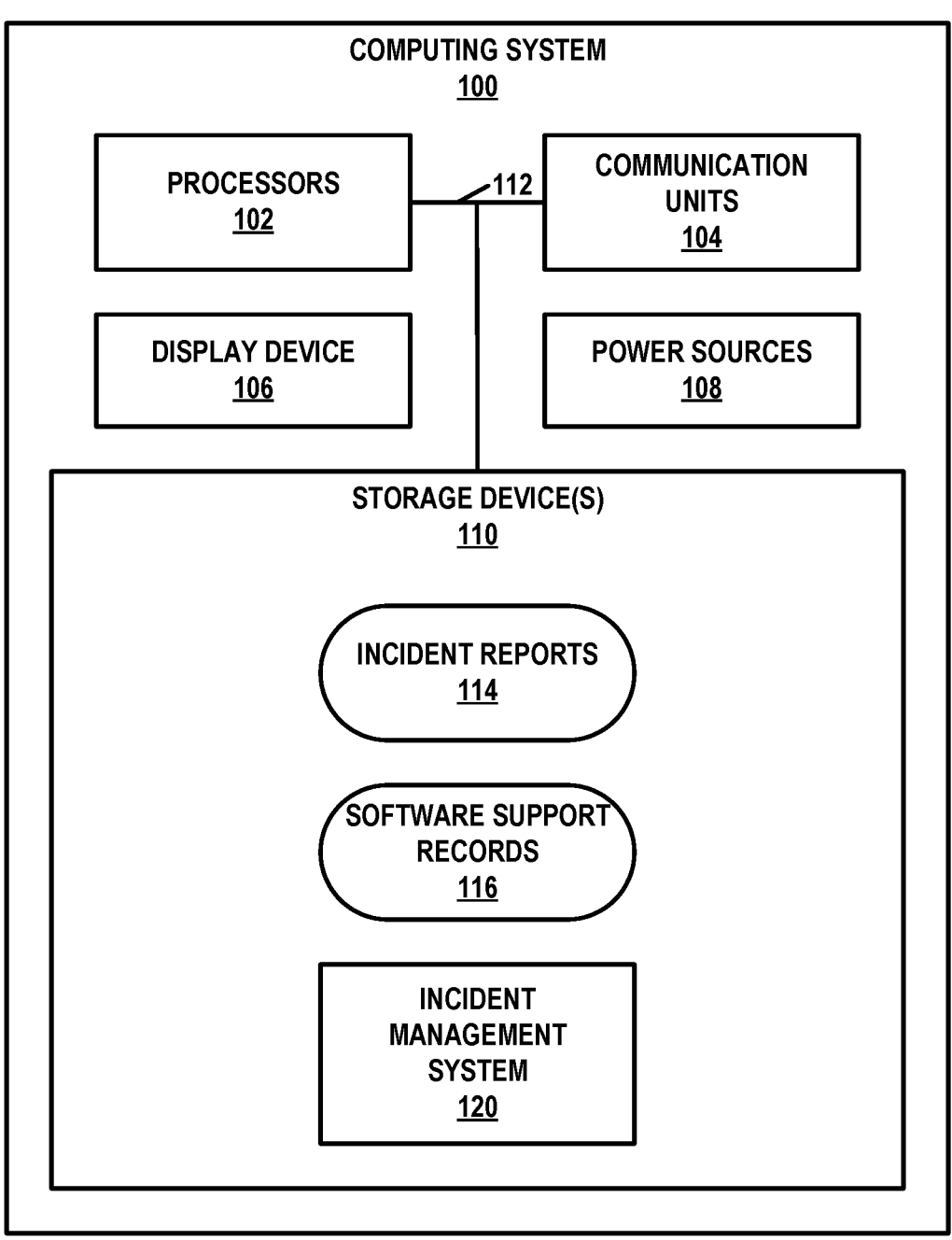
FIG. 1 is a block diagram illustrating an example computing system according to techniques of this disclosure.

FIG. 1 is a block diagram illustrating an example computing system 100 in accordance with one or more aspects of this disclosure. In the example of FIG. 1, computing system 100 includes one or more processors 102, one or more communication units 104, a display device 106, one or more power sources 108, one or more storage devices 110, and one or more communication channels 112. Computing system 100 may include other components. For example, computing system 100 may include input devices, output devices, display screens, and so on. Communication channels 112 may interconnect each of processors 102, communication units 104, and storage devices 110 for inter-component communications (physically, communicatively, and/or operatively). In some examples, communication channels 112 may include a system bus, a network connection, an inter-process communication data structure, or any other method for communicating data. Power sources 108 may provide electrical energy to processors 102. communication units 104, storage devices 110 and communication channels 112. Storage devices 110 may store information required for use during operation of computing system 100.

Processors 102 comprise circuitry configured to perform processing functions. For instance, one or more of processors 102 may be a microprocessor, an application-specific integrated circuit (ASIC), a field-programmable gate array (FPGA), or another type of processing circuitry. In some examples, processors 102 of computing system 100 may read and execute instructions stored by storage devices 110. Processors 102 may include fixed-function processors and/or programmable processors. Processors 102 may be included in a single device or distributed among multiple devices.

Communication units 104 may enable computing system 100 to send data to and receive data from one or more other computing devices (e.g., via a communications network, such as a local area network or the Internet). In some examples, communication units 104 may include wireless transmitters and receivers that enable computing system 100 to communicate wirelessly with other computing devices. Examples of communication units 104 may include network interface cards, Ethernet cards, optical transceivers, radio frequency transceivers, or other types of devices that are able to send and receive information. Other examples of such communication units may include BLUETOOTH™, 3G, 4G, 5G, and WI-FI™ radios, Universal Serial Bus (USB) interfaces, etc. Computing system 100 may use communication units 104 to communicate with one or more other computing devices or systems. Communication units 104 may be included in a single device or distributed among multiple devices.

Processors 102 may read instructions from storage devices 110 and may execute instructions stored by storage devices 110. Storage devices 110 may include non-transitory computer-readable storage media. Execution of the instructions by processors 102 may configure or cause computing system 100 to provide at least some of the functionality ascribed in this disclosure to computing system 100. Storage devices 110 may be included in a single device or distributed among multiple devices.

As shown in the example of FIG. 1, storage devices 110 may store incident reports 114, software support records 116, and computer-executable instructions associated with an incident management system (IMS) 120. Incident reports 114 may include textual descriptions of incidents regarding one or more software systems. For example, an incident report text may indicate, "The system is not using WV-21 disability information (stored in the IE), for all the applications that have been released for PATH program redetermination, for the purpose of Eligibility redeterminations."

After receiving an incident report for an incident, IMS 120 may enter a preprocessing stage in which IMS 120 formats the incident report to regularize vocabulary in the incident report. Regularizing the vocabulary in the incident report may include replacing acronyms with full text, converting text to lowercase, spelling correction, and so on. IMS 120 may have a set of rules for terms that have special meaning in the context of the software system that should not be replaced or altered.

After completion of the preprocessing stage, IMS 120 may enter a feature extraction stage. During the feature extraction stage, IMS 120 may determine an importance measure for terms in the regularized incident report. The importance measure for a term is a measure of how important the term is within the incident report or regularized incident report. For instance, in some examples, IMS 120 generates a Term Frequency Part of Speech-Inverse Document Frequency (TFPOS-IDF) value for each term in the regularized text of the incident report.

Additionally, during the feature extraction stage, IMS 120 may generate a 2-dimensional (2D) incident matrix. Each row of the matrix may correspond to a term in the incident report. Each of the columns of the matrix corresponds to a different recognized word in a predefined set of words. A row corresponding to a term in the incident report includes similarity values (e.g., floating point values) for each of the recognized words. The similarity values in a row corresponding to a term themselves do not have semantic meaning, but the vectors for terms with similar semantic meanings may have similar values. Thus, if the vectors for two terms are similar, the two terms likely have the same semantic meaning. The software system may use a pretrained word2vec model, which has been pretrained based on tokens (e.g., words) in a large corpus, such as the Google News dataset.

IMS 120 may generate an incident vector for the incident based on the matrix for the incident and the importance measures for the terms in the regularized incident report for the incident. The incident vector may include a value corresponding to each column of the matrix for the incident. For each respective combination of a predefined term and an incident report term in the regularized incident report, IMS 120 may determine an intermediate value for the respective combination based on the similarity value for the respective combination and the importance measure for the incident report term. IMS 120 may then calculate a cumulative value for the respective predefined term as a sum of the intermediate values for combinations of the respective predefined terms and the incident report terms. IMS 120 may include the cumulative value for the respective predefined term in the incident vector.

IMS 120 may then use the incident vector in a classification process. The classification process may use the incident vector to predict which modules (e.g., software modules) of the software system are likely to blame for the incident. For instance, the classification process may determine that a User Interface/User Experience (UI/UX) module of the software system is likely to blame for the incident.

Additionally, IMS 120 may use the incident vector to identify relevant software support records 116 that may help a technician resolve the incident. For example, IMS 120 may use the incident vector to identify bug fix records, records of resolution of similar incidents, and so on. To identify such records, IMS 120 may, for each of software support records 116, calculate a cosine similarity score for the incident vector and the record. Records with high cosine similarity scores are more likely to be relevant to the incident than records with low cosine similarity scores.

IMS 120 may output data to a user indicating the predicted modules and relevant software support records 116. Thus, in some examples, the incident can be routed to a technician knowledgeable about the predicted modules and the technician may be provided with software support records that may help to resolve the incident. The techniques of this disclosure for generating incident vectors that serve as the input to the ML models may improve the accuracy of the ML models in identifying relevant software support records 116 and/or relevant software modules because the incident vectors may take into account both word-level importance measures and semantic context.

Figure 2:
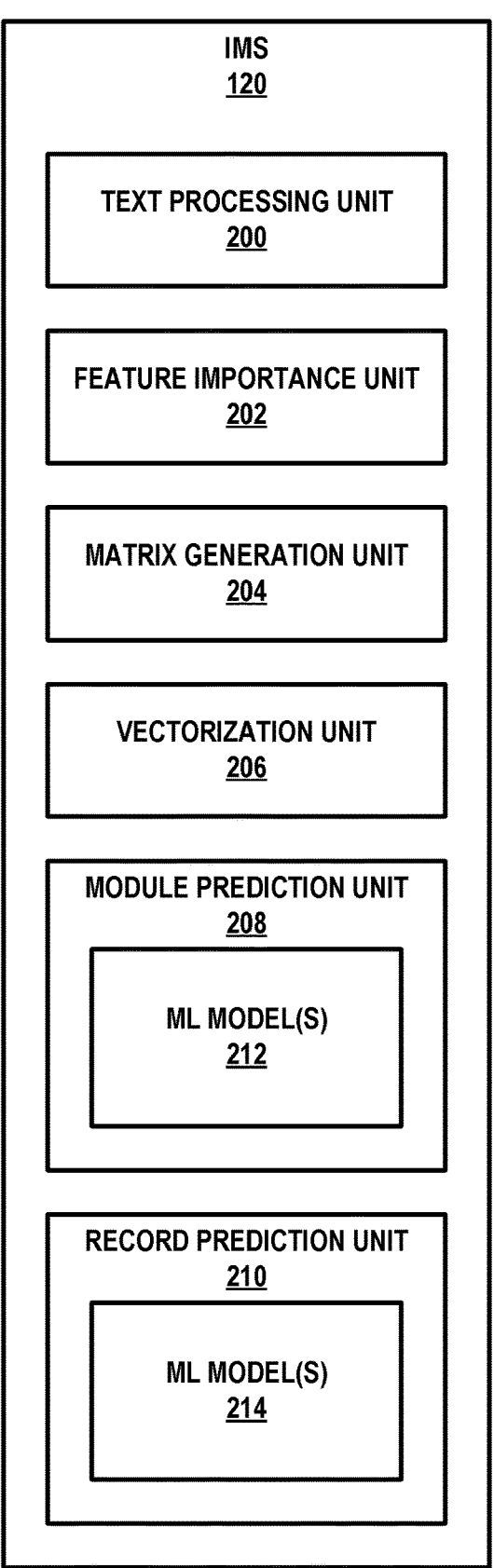
FIG. 2 is a block diagram illustrating example components of an incident management system (IMS) according to techniques of this disclosure.

FIG. 2 is a block diagram illustrating example components of IMS 120 according to techniques of this disclosure. In the example of FIG. 2, IMS 120 includes a text processing unit 200, a feature importance unit 202, a matrix generation unit 204, a vectorization unit 206, a module prediction unit 208, and a record prediction unit 210. Module prediction unit 208 may include one or more machine-learned (ML) models 212. Record prediction unit 210 may include one or more ML models 214.

Text processing unit 200 may receive an incident report comprising a textual description of an incident. Text processing unit 200 may generate a regularized incident report in which out-of-vocabulary terms in the received incident report are replaced with in-vocabulary terms. For example, text processing unit 200 may use a lookup table that maps out-of-vocabulary terms to corresponding in-vocabulary terms.

Feature importance unit 202 may determine importance measures for a plurality of incident report terms. Each of the incident report terms may be in the regularized incident report. The importance measure sets the priority of terms in the regularized incident report based on a modified Term Frequency-Inverse Document Frequency (TF-IDF) measure. Feature importance unit 202 may determine the importance measure using the following formulas:

$$TF(t, d) = \frac{c(t, d)}{\sum_i c(t_i, d)} \tag{1}$$

$$IDF(t) = 1 + \log\left(\frac{D}{d_t}\right) \tag{2}$$

$$TF - IDF(t, d) = TF(t, d) \cdot IDF(t) \tag{3}$$

In equation (1), c(t,d) indicates the number of times term t appears in regularized incident report d, and the denominator (i.e., $\sum_i c(t_i, d)$) indicates the total number of times each term appears in regularized incident report d. Thus, TF(t,d) indicates a percentage of times term t appears in regularized incident report d relative to a total number of times any term appears in regularized incident report d. In equation (2), D is the total number of incident reports in a dataset, and $d_t$ is the number of the incident reports in which a term t appeared. Thus, for each incident report term of the plurality of incident report terms in the regularized incident report, feature importance unit 202 may determine the importance measure for the incident report term based on (1) a frequency of the incident report term in the regularized incident report, and (2) an inverse frequency of a total number of incident reports in an incident report dataset relative to a quantity of the incident reports in the incident report dataset that contain the incident report term.

The performance of TF-IDF may be improved with some modification to the original equation of TF-IDF, which is expressed in equation (3). In the dataset of incident reports, verbs play an important role. Relying on the pre-defined list does not always guarantee good performance, especially for words that appear in more than one level. Therefore, the Term Frequency (TF)-Inverse Document Frequency (IDF) coupled with Part-Of-Speech (POS) is used as TFPOS-IDF. With incidents data analysis, verbs may be the most important words, while nouns and adjectives also carry a significant information in incident classification. Therefore, nouns and adjectives may be in the second rank, in which weight of nouns and adjectives may be less than the verbs but more significant than other parts of speech. Lastly, feature importance unit 202 may assign other parts of speech such as prepositions and pronouns to the lowest weights, as explained in below equation.

$$w_{pos}(t) = \begin{cases} w_1 & \text{if it is verb} \\ w_2 & \text{if } t \text{ is noun of adjective} \\ w_3 & \text{otherwise} \end{cases} \tag{4}$$

In Equation (4), $w_1 > w_2 > w_3 > 0$. For instance, the values of weights $w_1$, $w_2$, and $w_3$ may be $w_1=5$, $w_2=3$ and $w_3=1$. Thus, a new equation that represents term frequency based on parts of speech (TFPOS) may be:

$$TFPOS(t, d) = \frac{c(t, d) * w_{pos}(t)}{\sum_i c(t_i, d) * w_{pos}(t_i)} \tag{5}$$

Feature importance unit 202 may calculate the POS-TF-IDF(t,d) for term t in incident report d using the following equation:

$$\text{TFPOS–IDF}(t,d) = \text{TFPOS}(t,d) \cdot \text{IDF}(t) \tag{6}$$

By applying equation 6 for each term of the regularized incident report, feature importance unit 202 may generate be a sparse matrix (i.e., a matrix comprising high-dimensional vectors). After calculating TFPOS-IDF, feature importance unit 202 may normalize the feature vectors to prevent the numerical complexities during the calculation. In some examples, feature importance unit 202 may use the L2 norm for normalization.

In this way, feature importance unit 202 may, for each incident report term of the plurality of incident report terms, determine the importance measure for the incident report term based on (1) a frequency of the incident report term in the regularized incident report, (2) an inverse frequency of a total number of incident reports in an incident report dataset relative to a quantity of the incident reports in the incident report dataset that contain the incident report term, and further based on (3) which part of speech the incident report term is.

TFPOS-IDF focuses on giving verbs higher priority over other words. Focuses on the verbs might not be enough. In some examples, feature importance unit 202 may extract another feature, which is the semantic feature word embedding, which may further assist in determining the importance measure because additional features are available for determining the importance measure. Since the context of the incident report might carry an important information, this may help in determining the level of incident.

Figure 3:
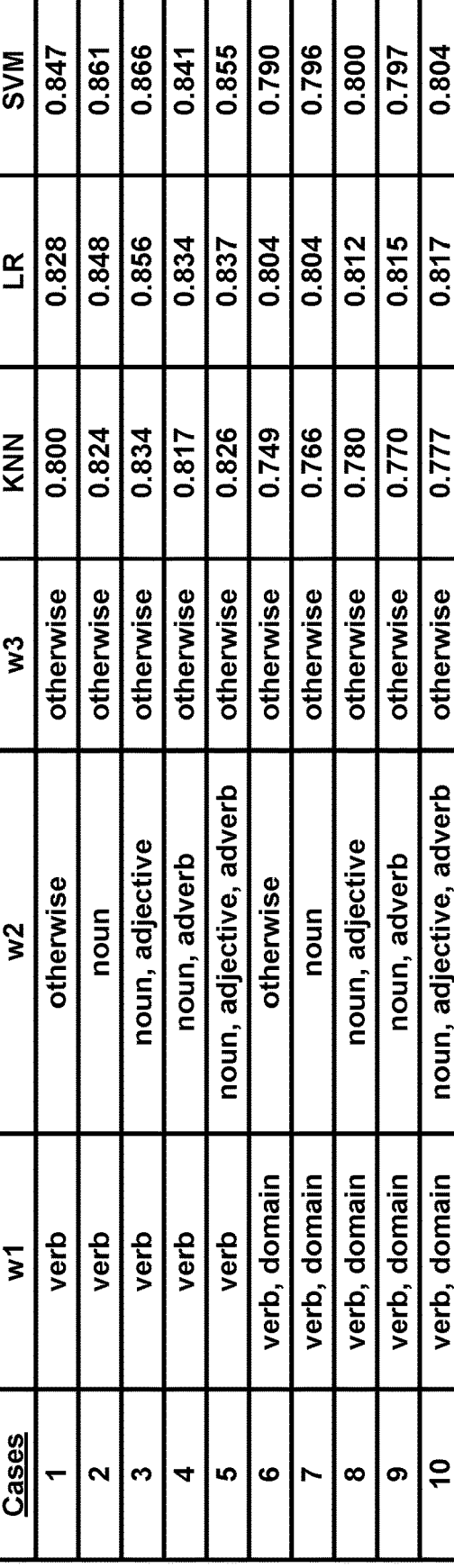
FIG. 3 is a table illustrating an example weighted F-1 measures of different weight cases with a collected dataset using k-nearest neighbors (KNN), linear regression (LR), and support vector machine (SVM) models according to techniques of this disclosure.

FIG. 3 is a table 300 illustrating an example weighted F-1 measures of different weight cases with a collected dataset using k-nearest neighbors (KNN), logistic regression (LR), and support vector machine (SVM) models according to techniques of this disclosure. Classifiers, such as KNN, LR, and SVM, may be compared by giving different weights to verbs, nouns, adjective, adverbs and domain words. For example, in an initial round (case 1 of FIG. 3), verbs were given high weights and everything else (and listed as otherwise in FIG. 3) was given low weights, so that in case 1, each of the models gives importance (e.g., frequency of occurrences, etc.) to words representing verbs in the sentences. In the second round (case 2 of FIG. 3), some weight was given to verbs and some weight (lesser then verbs) to nouns and kept everything else as generic. These permutations and combinations were repeated for our analysis with an intent to find out which among verbs, nouns, adjectives, adverbs, or domain words has a significant impact in our corpus. FIG. 3 indicates the result of that analysis, and per that 1) verbs may be the most important words, while nouns and adjectives also carry a significant information in incident classification. FIG. 3 also indicates that nouns and adjectives are in the second rank, in which their weight will be less than the verbs but more significant than other part of speech (POS). Additionally, FIG. 3 shows that other POS such as prepositions and pronouns will be assigned to the lowest weights.

Matrix generation unit 204 may generate an incident matrix in which similarity values are defined for each combination of a term in the plurality of incident report terms and a term in a predetermined term set. The predetermined term set may be a predetermined list of recognized terms. The use of the incident matrix may provide context for terms in the incident report.

In some examples, for each respective term in the plurality of terms in the regularized incident report, matrix generation unit 204 may apply one or more neural network models that take the respective term as input and that outputs a similarity value for each term in the predetermined term set. In other words, the one or more neural network models output a word vector for each respective term in the regularized incident report. In some examples, the predetermined term set includes 300 terms, thus the incident matrix may include 300 dimensions. The similarity values in the word vector for a term may be floating point values. The meanings of the similarity values may not have semantic meaning, but terms within similar meanings have similar word vectors. Matrix generation unit 204 may use the word2vec model developed by Google Inc., which was trained based on approximately one hundred billion tokens using the Google News dataset. In some examples, if a word is not recognized in the word2vec model, the word2vec model initializes the word vector for the word to zeros. The neural network used in the word2vec algorithm may use a group of two-layer neural networks. Furthermore, in some examples, matrix generation unit 204 provides complete terms (i.e., terms that have not been stemmed) from the regularized incident report as input to the neural network model.

Table 1, below, is an example of an incident matrix. In the example of Table 1, there are four terms in the regularized incident report, "recall, "main," "components," and "flow-chart."

TABLE 1

| | | | | | | | |
|---|---|---|---|---|---|---|---|
| Recall | −0.040 | 0.110 | 0.136 | 0.137 | ... | 0.053 | 0.053 |
| Main | −0.164 | −0.068 | 0.167 | −0.045 | ... | −0.110 | 0.074 |
| Components | −0.014 | 0.010 | 0.092 | 0.083 | ... | −0.151 | 0.140 |
| Flowchart | 0.008 | −0.006 | −0.006 | 0.002 | ... | −0.200 | −.009 |

Vectorization unit 206 may generate an incident vector based on the incident matrix and the importance measures for the terms in the incident report. The size of the incident vector may be equal to the quantity of terms in the predetermined term set (e.g., 300).

In some examples, to generate the incident vector based on the incident matrix and the importance measures, vectorization unit 206 may, for each respective combination of the respective predefined term and an incident report term in the regularized incident report, determine an intermediate value for the respective combination based on the similarity value for the respective combination and the importance measure for the incident report term. Vectorization unit 206 may then calculate a cumulative value for the respective predefined term as a sum of the intermediate values for combinations of the respective predefined terms and the incident report terms. Vectorization unit 206 may include the cumulative value for the respective predefined term in the incident vector. In some examples, vectorization unit 206 may apply the following equation to generate each element in the incident vector:

$$\text{Incident Vector} = \Sigma_{t \in d}\, \text{Word2Vec}(t) * [\text{TFPOS-IDF}(t,d)]$$

In the equation above, t is a term in the incident report, Word2Vec(t) is a word vector for term t generate by the neural network (e.g., Word2Vec) and "TFPOS-IDF(t,d)" is the importance measure for term t is incident report d.

Module prediction unit 208 may identify relevant software modules based on the incident vector. The relevant software modules are potentially relevant to the incident. In some examples, module prediction unit 208 may use one or more ML models 212 to identify the relevant software modules. For example, module prediction unit 208 may apply a k-nearest neighbor (KNN) ML model to identify the relevant software modules. In this example, module prediction unit 208 may generate incident vectors (e.g., in the manner described elsewhere in this disclosure) for incident reports that have been identified (e.g., by a SME) as being relevant to particular software modules. Typically, the incident vectors for incident reports relevant to the same software module are clustered together is an n-dimensional space, where n is the quantity of elements in an incident vector. When module prediction unit 208 is identifying a relevant software module based on an incident vector, module prediction unit 208 may identify k nearest neighbors to the incident vector in the n-dimensional space. Module prediction unit 208 may then determine which of the software modules is associated with a majority (or weighted majority) of the identified k nearest neighbors.

In some examples, module prediction unit 208 may use an ensemble of classifier models (e.g., a KNN model, a logistic regression model, and a support vector machine (SVM) model) to identify the relevant software modules. In other words, module prediction unit 208 may apply a plurality of trained classifier models. Each of the classifier models may individually predict relevant software modules. Module prediction unit 208 may then identify which of the software modules were most identified as being relevant by the plurality of classifier models. Module prediction unit 208 may identify the most-identified software modules as the relevant software modules. This may be analogous to each of the classifier models having a vote on which of the software modules are relevant. Using an ensemble of classifier models, as opposed to a single ML model, may reduce multinomial cross-entropy loss for classification of software modules.

Record prediction unit 210 may identify relevant software support records 116 based on the incident vector. The relevant software support records 116 are potentially relevant to the incident. In some examples, record prediction unit 210 may generate incident vectors for a corpus of the software support records 116. Record prediction unit 210 may also calculate cosine similarity scores for the incident vector and the incident vectors for the corpus of software support records 116. Cosine similarity is a measure of similarity of two non-zero size vectors of numbers. Specifically, cosine similarity is a measure of the cosine of an angle between two vectors if plotted in N-dimensional coordinate system. Smaller the angle, more similar the vectors are. In the context of this disclosure, there may be a vector of incoming incident, and a matrix of vectors for defects, test cases and solutions. Record prediction unit 210 may calculate a cosine similarity between the incoming incident vector and the matrix of vectors of defects/testcases/solutions. The angle can vary from 0 (most similar) to 180 degrees (most dissimilar). Accordingly, cosine of the angle (cos θ) can vary from 1 to −1, with 1 denoting most similar and −1 denoting most dissimilar. Mathematically, it is defined as below:

$$\text{similarity } (A, B) = \frac{A \cdot B}{\|A\| \times \|B\|}$$

where A and B are vectors of numbers. ‖A‖ is magnitude of vector A and ‖B‖ is magnitude of vector B.

Record prediction unit 210 may then identify the relevant software support records 116 based on the cosine similarity scores. For instance, record prediction unit 210 may identify software support records 116 having relatively high cosine similarity scores (e.g., as compared to a threshold, as compared to each other, etc.).

IMS 120 may output data identifying relevant software support records 116 and/or software modules. For example, IMS 120 may generate a user interface, such as a webpage or native application user interface, that contains lists of the relevant software support records 116 and/or software modules. In some examples, IMS 120 may output the data identifying relevant software support records 116 and/or software modules to one or more other computing devices or software systems.

IMS 120 may use an ensemble of machine learning (ML) models to predict which modules of the software system are likely to blame for the incident. For example, the IMS may use a k-nearest neighbor (KNN) model as one of the ML models of the ensemble. Other example ML modules that may be used in the ensemble include logistic regression modules and support vector machine (SVM) models.

Figure 4:
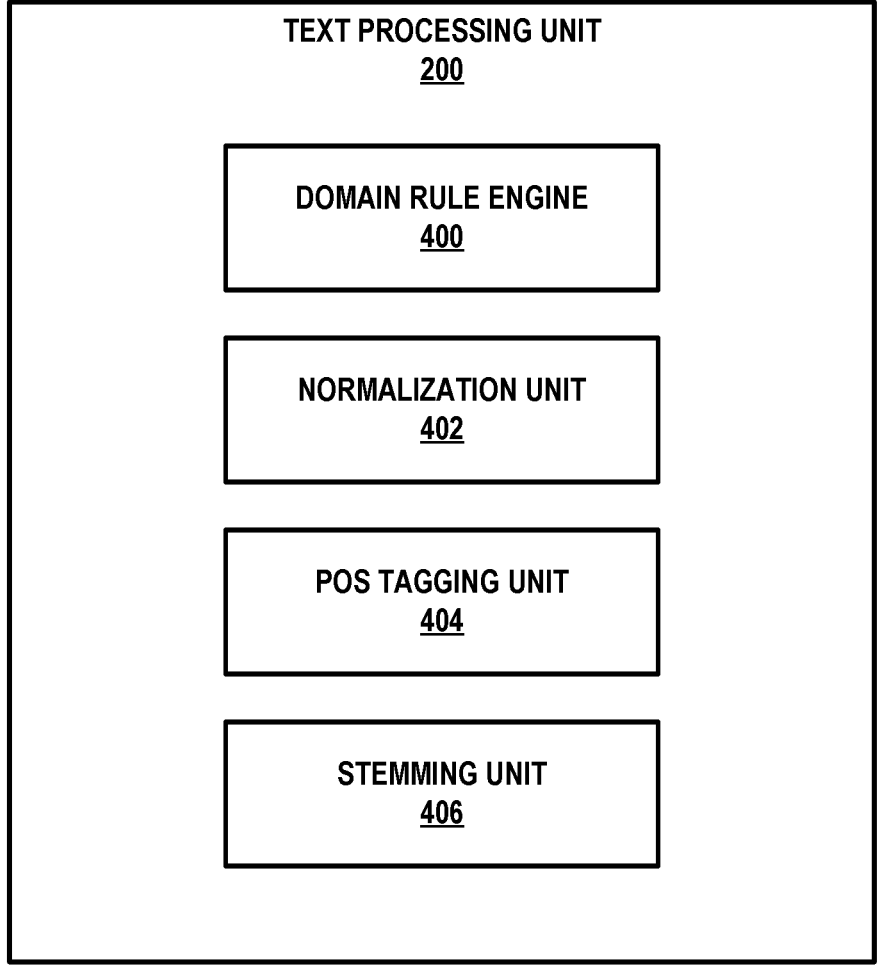
FIG. 4 is a block diagram illustrating example components of a text processing unit according to techniques of this disclosure.

FIG. 4 is a block diagram illustrating example components of text processing unit 200 according to techniques of this disclosure. In the example of FIG. 4, text processing unit 200 includes a domain rule engine 400, a normalization unit 402, a part-of-speech (POS) tagging unit 404, and a stemming unit 406. In other examples, text processing unit 200 may include more, fewer, or different units.

Domain rule engine 400 may apply a rule-based approach that identifies specific words or abbreviations that have specific meanings within the context of the software system. For example, the term "IE" is not a standard English vocabulary word but "IE" may be an acronym for a term having a specific meaning within the context of the software system. However, in this example, "i.e." is used in English sentences. In this example, domain rule engine 400 may apply a rule set specifying replacement of the term "IE" with a regularized version, such as "Integrated Eligibility." Thus, replacing "IE" with "Integrated Eligibility" is an example of replacing an out-of-vocabulary word with an in-vocabulary word.

Normalization unit 402 may eliminate unnecessary data from the incident report. For example, normalization unit 402 may remove punctuation marks, numbers, and non-English characters. In some examples, normalization unit 402 may convert all letters in the incident report to a target case (e.g., lowercase or uppercase). In some examples, normalization unit 402 may normalize spellings of terms, e.g., to convert colour to color. Thus, replacing colour with color is an example of replacing an out-of-vocabulary word with an in-vocabulary word. In some examples, normalization unit 402 may remove stop-words from the incident report. Stop words are a set of commonly used words in any language are filtered out before or after processing of natural language data because they are insignificant. For example, in English, "the," "is." and "and" may qualify as stop words. In natural language processing (NLP) and text mining applications, stop words are used to eliminate unimportant words, allowing applications to focus on the important words instead. Furthermore, in some examples, normalization unit 402 may tokenize the incident report by splitting the text of the incident report into individual words (i.e., tokens) based on whitespaces.

POS tagging unit 404 may tag words of the incident report as being specific parts of speech. For example, POS tagging unit 404 may tag words as being nouns, verbs, adverbs, adjectives, and so on. To tag words as being specific parts of speech, POS tagging unit 404 may use a table that maps known words to parts of speech. In some examples, such as examples where the same word may be two or more parts of speech, POS tagging unit 404 may apply a syntax analysis system that determines the parts of speech based on sentence structure.

Stemming unit 406 may perform stemming on terms. Stemming is a process of deleting prefixes and suffixes from terms to return the terms to their roots. For example, stemming unit 406 may change the terms "waits," "waiting." and "waited" to "wait." In some examples, stemming unit may use the Porter stemmer in the Natural Language Tool Kit (NLTK) of Python.

Figure 5:
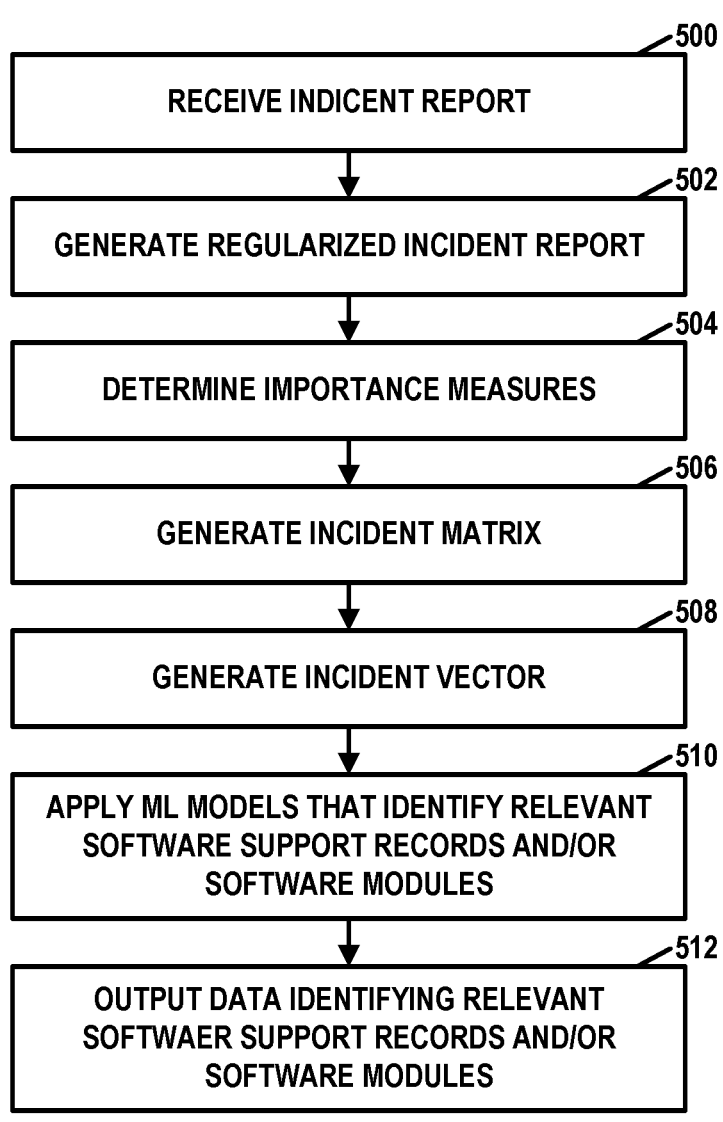
FIG. 5 is a flowchart illustrating an example operation of the IMS according to techniques of this disclosure.

FIG. 5 is a flowchart illustrating an example operation of IMS 120 according to techniques of this disclosure. The operation of FIG. 5 is provided as an example. Other example operations of IMS 120 may include more, fewer, or different actions, or actions in different orders.

In the example of FIG. 5, IMS 120 may receive an incident report comprising a textual description of an incident involving a software system (500). For example, IMS 120 may receive the incident report as text input from a user. In other examples, IMS 120 may receive the incident report via an application programming interface (API), from a computer-readable storage medium, or in other ways. In some examples where IMS 120 receives the incident report via an API, the API may be REST based. The API may be developed using Flask in a Python framework.

In some examples, the API allows a user to limit the results based on relevancy. For example, the API may receive an indication from the user that instructs the API to only return an indication of a predicted module if a confidence score for the predicted module is above a specific threshold. In some examples, the API may receive an indication from the user that instructs the API to only return a specific number of the most-relevant bugs or defects. Similarly, the API may receive an indication from the user that instructs the API to only return a specifies number of test cases or solutions. Limiting the results returned by the API may help to avoid the user being overwhelmed with results.

Text processing unit 200 of IMS 120 may generate a regularized incident report in which out-of-vocabulary terms in the received incident report are replaced with in-vocabulary terms (502). For example, text processing unit 200 may eliminate punctuation marks and numbers from the incident report, convert text in the incident report to a consistent case (e.g., all uppercase or all lowercase), tokenize the text into terms, tag terms with parts of speech identifiers, apply stemming to terms, and so on.

Feature importance unit 202 of IMS 120 may determine importance measures for a plurality of incident report terms, wherein each of the incident report terms is in the regularized incident report (504). For example, feature importance unit 202 may, for each incident report term of the plurality of incident report terms, determine the importance measure for the incident report term based on (1) a frequency of the incident report term in the regularized incident report, and (2) an inverse frequency of a total number of incident reports in an incident report dataset and a quantity of the incident reports in the incident report dataset that contain the incident report term. In some examples, feature importance unit 202 may further determine the importance measure for the incident report term based on which part of speech the incident report term is.

Matrix generation unit 204 of IMS 120 may generate an incident matrix in which similarity values are defined for combinations of terms in the incident report and terms in a predetermined term set (506). For example, for each respective term in the plurality of terms in the regularized incident report, matrix generation unit 204 may apply one or more neural network models (e.g., word2vec) that take the respective term as input and that outputs a similarity value for each term in the predetermined term set.

Vectorization unit 206 of IMS 120 may generate an incident vector based on the incident matrix and the importance measures for the incident report terms (508). For instance, for each respective combination of the respective predefined term and an incident report term in the regularized incident report, vectorization unit 206 may determine an intermediate value for the respective combination based on the similarity value for the respective combination and the importance measure for the incident report term. Vectorization unit 206 may calculate a cumulative value for the respective predefined term as a sum of the intermediate values for combinations of the respective predefined terms and the incident report terms. Vectorization unit 206 may include the cumulative value for the respective predefined term in the incident vector.

Module prediction unit 208 of IMS 120 and record prediction unit 210 may apply one or more ML models (e.g., ML models 212, 214) that identify, based on the incident vector, relevant software support records 116 and/or software modules of the software system (510). The relevant software support records 116 and the software modules are potentially relevant to the incident. The software support records 116 may include one or more of bug records, test cases, or records of resolutions of incidents similar to the incident. The following table illustrates example incident records, along with a relevant software module.

| Incident ID | Description | Module |
|---|---|---|
| 20891 | The system does not follow the response rules requirement document that has been attached fro RIDP V2. | RIDP |
| 20443 | The system did not exclude a member from pending WV benefit when the member is less than 21 years of age. | Eligibility Verification |
| 20156 | The system does not follow the rules defined in "handling Multiple Discrepancy" when there are multiple discrepancy identified during the PDM process. | Periodic Data Matching |

The following table illustrates example test case data.

| Test ID | Description | Work Track |
|---|---|---|
| 34524 | This test case validates that system should not generate VR | Eligibility Verification |

-continued

| Test ID | Description | Work Track |
|---|---|---|
| | notices when there is an eligibility redetermined during PDM Process. | |
| 35972 | This test case validates that system should not give JAXB error in MMIS transaction on Time Clock expiry for DOR discrepancy (DOR_INCOME_INCOMPATIBLE) | Periodic Data Matching |
| 52767 | This testcase validates that records are processed for auto enrollment with out any marshelling error | Open Enrollment |

The following table illustrates example bug data.

| Bug ID | Description | Work Track |
|---|---|---|
| 24833 | The eligibility effective date is calculated incorrectly when the member is marked pregnant in RAC for initial pend. | Program Determination |
| 24930 | Aid Cat given to QAB and ILP members after Immigration RFI Expiry is "1Y-(Health Safety Net Partial)' instead of "AP-(Health Safety Net Partial)" | Eligibility Verification |
| 24029 | Home and mailing addresses are not listed correctly in the Application Summary section. | Address Standardization |

IMS 120 may output data identifying relevant software support records 116 and/or software modules (512). For example, IMS 120 may generate a user interface, such as a webpage or native application user interface, that contains lists of the relevant software support records 116 and/or software modules. In some examples, IMS 120 may output the data identifying relevant software support records 116 and/or software modules to one or more other computing devices or software systems. In some examples, IMS 120 may output recommended test cases for reference from historical releases. The test cases may be sets of input and/or procedures used to test a software system for specific problems. The recommended test cases may be an output of the ensemble model. For any incoming incident vector, the incident text is converted into a vector via TFPOS-IDF coupled with word2vec, and a cosine similarity score corresponding to the incident vector and historical test cases vector may be calculated. Test cases with high cosine similarity scores are listed to the end user. In some examples, IMS 120 may output recommended solutions for the incident. For instance, the relevant software support records 116 may indicate solutions as well as descriptions of incidents. IMS 120 may perform a similar process to recommend bugs and solutions.

In some examples, IMS 120 may output trend information. For instance, IMS 120 may output data indicating percentages of incidents involving particular software modules, output data indicating which incident reports were most helpful in resolving incidents, and so on. In some examples, the trend information may include data to answer questions such as: how many similar issues have occurred in the past?, how were those issues resolved?, what was average time it took to resolve the issues?, is there reoccurrence of the same issue?, were changes performed in response to previously reported issues?, where any problem tickets already fixed or in progress to fix the reported issue permanently by address a root cause of the issue?, and so on. The following table illustrates example trend data.

| Data Category | Counts | Key data elements |
|---|---|---|
| Incidents | 1215 | Incident ID, Issue Description, Resolution details, Workaround, Module |
| Defects/Bugs | 4340 | Defect ID, Defect Description, Resolution, Module |
| Test Cases | 14634 | Test Case ID, Description, Module |

In some examples, IMS 120 may output graph data indicating a distribution of software modules involved with incidents, graph data indicating a distribution of software modules associated with defects or bugs, and/or graph data indicating a distribution of software modules associated with test cases.

The following is a non-limiting list of examples in accordance with one or more techniques of this disclosure.

Example 1: A method performed by a computing system includes receiving an incident report comprising a textual description of an incident involving a software system; generating a regularized incident report in which out-of-vocabulary terms in the received incident report are replaced with in-vocabulary terms; determining importance measures for a plurality of incident report terms, wherein each of the incident report terms is in the regularized incident report; generating an incident matrix in which similarity values are defined for combinations of terms in the incident report and terms in a predetermined term set; generating an incident vector based on the incident matrix and the importance measures for the terms in the incident report; applying one or more machine learning (ML) models that identify, based on the incident vector, relevant software support records and/or software modules of the software system, wherein the relevant software support records and the software modules are potentially relevant to the incident; and outputting data identifying relevant software support records and/or software modules.

Example 2: The method of example 1, wherein determining the importance measures for the plurality of incident report terms comprises, for each incident report term of the plurality of incident report terms, determining the importance measure for the incident report term based on (1) a frequency of the incident report term in the regularized incident report, and (2) an inverse frequency of a total number of incident reports in an incident report dataset relative to a quantity of the incident reports in the incident report dataset that contain the incident report term.

Example 3: The method of example 2, wherein the importance measure for the incident report term is further based on which part of speech the incident report term is.

Example 4: The method of any of examples 1 through 3, wherein the software support records include one or more of bug fix records or records of resolutions of incidents similar to the incident.

Example 5: The method of any of examples 1 through 4, wherein identifying the relevant software support records comprises: generating incident vectors for a corpus of the software support records; calculating cosine similarity scores for the incident vector and the incident vectors for the corpus of software support records; and identifying the relevant software support records based on the cosine similarity scores.

Example 6: The method of any of examples 1 through 5, wherein applying the one or more ML models comprises applying a k-nearest neighbor (KNN) ML model that identifies the relevant software modules.

Example 7: The method of any of examples 1 through 6, wherein generating the incident matrix comprises, for each respective term in the plurality of terms in the regularized incident report, applying one or more neural network models that take the respective term as input and that output a similarity value for each term in the predetermined term set.

Example 8: The method of any of examples 1 through 7, wherein generating the incident vector comprises, for each respective predefined term in the predefined term set: for each respective combination of the respective predefined term and an incident report term in the regularized incident report, determining an intermediate value for the respective combination based on the similarity value for the respective combination and the importance measure for the incident report term; calculating a cumulative value for the respective predefined term as a sum of the intermediate values for combinations of the respective predefined terms and the incident report terms; and including the cumulative value for the respective predefined term in the incident vector.

Example 9: A system includes a storage device configured to store an incident report includes receive an incident report comprising a textual description of an incident; generate a regularized incident report in which out-of-vocabulary terms in the received incident report are replaced with in-vocabulary terms; determine importance measures for a plurality of incident report terms, wherein each of the incident report terms is in the regularized incident report; generate an incident matrix in which similarity values are defined for combinations of terms in the incident report and terms in a predetermined term set; generate an incident vector based on the incident matrix and the importance measures for the terms in the incident report; apply one or more machine learning (ML) models that identify, based on the incident vector, relevant software support records and/or software modules of the software system, wherein the relevant software support records and the software modules are potentially relevant to the incident; and output data identifying relevant software support records and/or software modules.

Example 10: The system of example 9, wherein the one or more processors are configured to, as part of determining the importance measures for the plurality of incident report terms, for each incident report term of the plurality of incident report terms, determine the importance measure for the incident report term based on (1) a frequency of the incident report term in the regularized incident report, and (2) an inverse frequency of a total number of incident reports in an incident report dataset relative to a quantity of the incident reports in the incident report dataset that contain the incident report term.

Example 11: The system of example 10, wherein the importance measure for the incident report term is further based on which part of speech the incident report term is.

Example 12: The system of any of examples 9 through 11, wherein the software support records include one or more of bug fix records or records of resolutions of incidents similar to the incident.

Example 13: The system of any of examples 9 through 12, wherein the one or more processors are configured to, as part of identifying the relevant software support records: generate incident vectors for a corpus of the software support records; calculate cosine similarity scores for the incident vector and the incident vectors for the corpus of software support records; and identify the relevant software support records based on the cosine similarity scores.

Example 14: The system of any of examples 9 through 13, wherein the one or more processors are configured to, as part of applying the one or more ML models, apply a k-nearest neighbor (KNN) ML model that identifies the relevant software modules.

Example 15: The system of any of examples 9 through 14, wherein the one or more processors are configured to, as part of generating the incident matrix, for each respective term in the plurality of terms in the regularized incident report, apply a neural network model that takes the respective term as input and that outputs a similarity value for each term in the predetermined term set.

Example 16: The system of any of examples 9 through 15, wherein the one or more processors are configured to, as part of generating the incident vector, for each respective predefined term in the predefined term set: for each respective combination of the respective predefined term and an incident report term in the regularized incident report, determine an intermediate value for the respective combination based on the similarity value for the respective combination and the importance measure for the incident report term; calculate a cumulative value for the respective predefined term as a sum of the intermediate values for combinations of the respective predefined terms and the incident report terms; and include the cumulative value for the respective predefined term in the incident vector.

Example 17: A non-transitory computer-readable storage medium includes receive an incident report comprising a textual description of an incident involving a software system; generate a regularized incident report in which out-of-vocabulary terms in the received incident report are replaced with in-vocabulary terms; determine importance measures for a plurality of incident report terms, wherein each of the incident report terms is in the regularized incident report; generate an incident matrix in which similarity values are defined for combinations of terms in the incident report and terms in a predetermined term set; generate an incident vector based on the incident matrix and the importance measures for the terms in the incident report; apply one or more machine learning (ML) models that identify, based on the incident vector, relevant software support records and/or software modules of the software system, wherein the relevant software support records and the software modules are potentially relevant to the incident; and output data identifying relevant software support records and/or software modules.

Example 18: The non-transitory computer-readable storage medium of example 17, wherein the instructions that cause the one or more processors to generate the incident matrix comprise instructions that, when executed, cause the one or more processors to, for each respective term in the plurality of terms in the regularized incident report, apply one or more neural network models that take the respective term as input and that output a similarity value for each term in the predetermined term set, and wherein the instructions that cause the one or more processors to generate the incident vector comprise instructions that, when executed, cause the one or more processors to, for each respective predefined term in the predefined term set: for each respective combination of the respective predefined term and an incident report term in the regularized incident report, determine an intermediate value for the respective combination based on the similarity value for the respective combination and the importance measure for the incident report term; calculate a cumulative value for the respective predefined term as a sum of the intermediate values for combinations of the respective predefined terms and the incident report terms; and include the cumulative value for the respective predefined term in the incident vector.

For processes, apparatuses, and other examples or illustrations described herein, including in any flowcharts or flow diagrams, certain operations, acts, steps, or events included in any of the techniques described herein can be performed in a different sequence, may be added, merged, or left out altogether (e.g., not all described acts or events are necessary for the practice of the techniques). Moreover, in certain examples, operations, acts, steps, or events may be performed concurrently, e.g., through multi-threaded processing, interrupt processing, or multiple processors, rather than sequentially. Further certain operations, acts, steps, or events may be performed automatically even if not specifically identified as being performed automatically. Also, certain operations, acts, steps, or events described as being performed automatically may be alternatively not performed automatically, but rather, such operations, acts, steps, or events may be, in some examples, performed in response to input or another event.

Further, certain operations, techniques, features, and/or functions may be described herein as being performed by specific components, devices, and/or modules. In other examples, such operations, techniques, features, and/or functions may be performed by different components, devices, or modules. Accordingly, some operations, techniques, features, and/or functions that may be described herein as being attributed to one or more components, devices, or modules may, in other examples, be attributed to other components, devices, and/or modules, even if not specifically described herein in such a manner.

In one or more examples, the functions described may be implemented in hardware, software, firmware, or any combination thereof. If implemented in software, the functions may be stored on or transmitted over a computer-readable medium as one or more instructions or code and executed by a hardware-based processing unit. Computer-readable media may include computer-readable storage media, which corresponds to a tangible medium such as data storage media, or communication media including any medium that facilitates transfer of a computer program from one place to another, e.g., according to a communication protocol. In this manner, computer-readable media generally may correspond to (1) tangible computer-readable storage media which is non-transitory or (2) a communication medium such as a signal or carrier wave. Data storage media may be any available media that can be accessed by one or more computers or one or more processors to retrieve instructions, code and/or data structures for implementation of the techniques described in this disclosure. A computer program product may include a computer-readable medium.

By way of example, and not limitation, such computer-readable storage media can include RAM, ROM, EEPROM, CD-ROM, or other optical disk storage, magnetic disk storage, or other magnetic storage devices, flash memory, or any other medium that can be used to store desired program code in the form of instructions or data structures and that can be accessed by a computer. Also, any connection is properly termed a computer-readable medium. For example, if instructions are transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium. It should be understood, however, that computer-readable storage media and data storage media do not include connections, carrier waves, signals, or other transitory media, but are instead directed to non-transitory, tangible storage media. Disk and disc, as used herein, includes compact disc (CD), laser disc, optical disc, digital versatile disc (DVD), floppy disk and Blu-ray disc, where disks usually reproduce data magnetically, while discs reproduce data optically with lasers. Combinations of the above should also be included within the scope of computer-readable media.

Instructions may be executed by one or more processors, such as one or more DSPs, general purpose microprocessors, ASICs, microcontrollers, FPGAs, or other equivalent integrated or discrete logic circuitry, as well as any combination of such components. Accordingly, the term "processor," as used herein, may refer to any of the foregoing structures or any other structure suitable for implementation of the techniques described herein. In addition, in some aspects, the functionality described herein may be provided within dedicated hardware and/or software modules. Also, the techniques could be fully implemented in one or more circuits or logic elements.

The techniques of this disclosure may be implemented in a wide variety of devices or apparatuses, including a wireless communication device or wireless handset, a microprocessor, an integrated circuit (IC) or a set of ICs (e.g., a chip set). Various components, modules, or units are described in this disclosure to emphasize functional aspects of devices configured to perform the disclosed techniques, but do not necessarily require realization by different hardware units. Rather, as described above, various units may be combined in a hardware unit or provided by a collection of interoperative hardware units, including one or more processors as described above, in conjunction with suitable software and/or firmware.

What is claimed is:

1. A computer-implemented method performed by a computing system, the computer-implemented method comprising:

storing, by one or more processors, a corpus of software support records;

receiving, by the one or more processors, an incident report comprising a textual description of an incident involving a software system;

generating, by the one or more processors, a regularized incident report in which out-of-vocabulary terms in the incident report are replaced with in-vocabulary terms;

determining, by the one or more processors, importance measures for a plurality of incident report terms, wherein each of the incident report terms is in the regularized incident report, wherein determining the importance measures comprises weighting parts of speech of the regularized incident report, and wherein the importance measures are determined based on weightings of the parts of speech;

generating, by the one or more processors, an incident matrix in which similarity values are defined for combinations of the incident report terms in the incident report and terms in a predetermined term set;

generating, by the one or more processors, an incident vector based on the incident matrix and the importance measures for the plurality of incident report terms in the regularized incident report;

applying, by the one or more processors, one or more machine learning (ML) models that identify, based on the incident vector, one or more relevant software support records in the corpus of software support records, wherein the one or more relevant software support records are potentially relevant to the incident;

identifying, by the one or more processors, a cluster of neighboring incident report vectors in an n-dimensional space of a plurality of neighboring incident vectors that each correspond to an incident report for a software module;

determining, by the one or more processors, one or more relevant software modules based on the identification of the cluster of the neighboring incident report vectors; and outputting, by the one or more processors, data identifying the one or more relevant software support records and the one or more relevant software modules.

2. The computer-implemented method of claim 1, wherein determining the importance measures for the plurality of incident report terms comprises, for each incident report term of the plurality of incident report terms, determining the importance measure for the incident report term based on (1) a frequency of the incident report term in the regularized incident report, and (2) an inverse frequency of a total number of incident reports in an incident report dataset relative to a quantity of the incident reports in the incident report dataset that contain the incident report term.

3. The computer-implemented method of claim 1, wherein the one or more relevant software support records include one or more of one or more bug fix records or one or more records of one or more resolutions of one or more incidents similar to the incident.

4. The computer-implemented method of claim 1, wherein identifying the one or more relevant software support records comprises:

generating a plurality of incident vectors for the corpus of the software support records;

calculating a plurality of cosine similarity scores for the incident vector and the plurality of incident vectors for the corpus of software support records; and identifying the one or more relevant software support records based on the plurality of cosine similarity scores.

5. The computer-implemented method of claim 1, wherein applying the one or more ML models comprises applying a k-nearest neighbor (KNN) ML model that identifies the one or more relevant software modules.

6. The computer-implemented method of claim 1, wherein generating the incident matrix comprises, for each respective incident report term in the plurality of incident report terms in the regularized incident report, applying one or more neural network models that take the respective incident report term as input and that output a similarity value for each term in the predetermined term set.

7. The computer-implemented method of claim 1, wherein the plurality of terms in the predetermined term set comprises a plurality of predefined terms, and wherein generating the incident vector comprises, for each respective predefined term in the plurality of predefined terms:

for each respective combination of the respective predefined term and an incident report term in the regularized incident report, determining an intermediate value for the respective combination based on a similarity value for the respective combination and the importance measure for the incident report term;

calculating a cumulative value for the respective predefined term as a sum of the intermediate values for combinations of the respective predefined terms and the incident report terms; and including the cumulative value for the respective predefined term in the incident vector.

8. The computer-implemented method of claim 1, wherein:

the one or more ML models comprise a plurality of ML models, applying the one or more ML models further comprises applying each ML model of the plurality of ML models to identify a software module that is potentially relevant to the incident, and determining the one or more relevant software modules comprises identifying one or more most-identified software modules as the one or more relevant software modules.

9. A system comprising:

one or more processors; and one or more storage devices configured to store an incident report comprising a textual description of an incident involving a software system and processor-executable instructions that, when executed by the one or more processors, cause the one or more processors to perform operations comprising:

storing a corpus of software support records;

generating a regularized incident report in which out-of-vocabulary terms in the regularized incident report are replaced with in-vocabulary terms;

determining importance measures for a plurality of incident report terms, wherein each of the incident report terms is in the regularized incident report, wherein determining the importance measures comprises weighting parts of speech of the regularized incident report, and wherein the importance measures are determined based on weightings of the parts of speech;

generating an incident matrix in which similarity values are defined for combinations of the incident report terms in the incident report and terms in a predetermined term set;

generating an incident vector based on the incident matrix and the importance measures for the plurality of incident report terms in the incident report;

applying one or more machine learning (ML) models that identify, based on the incident vector, one or more relevant software support records in the corpus of software support records, wherein the one or more relevant software support records are potentially relevant to the incident;

identifying a cluster of neighboring incident report vectors in an n-dimensional space of a plurality of neighboring incident vectors that each correspond to an incident report for a software module;

determining one or more relevant software modules based on the identification of the cluster of the neighboring incident report vectors; and outputting data identifying the one or more relevant software support records and the one or more relevant software modules.

10. The system of claim 9, wherein determining the importance measures for the plurality of incident report terms comprises, for each incident report term of the plurality of incident report terms, determine the importance measure for the incident report term based on (1) a frequency of the incident report term in the regularized incident report, and (2) an inverse frequency of a total number of incident reports in an incident report dataset relative to a quantity of the incident reports in the incident report dataset that contain the incident report term.

11. The system of claim 9, wherein the one or more relevant software support records include one or more of one or more bug fix records or one or more records of one or more resolutions of one or more incidents similar to the incident.

12. The system of claim 9, wherein identifying the one or more relevant software support records comprises:

generating a plurality of incident vectors for the corpus of the software support records;

calculating a plurality of cosine similarity scores for the incident vector and the plurality of incident vectors for the corpus of the software support records; and identifying the one or more relevant software support records based on the plurality of cosine similarity scores.

13. The system of claim 9, wherein applying the one or more ML models comprises applying a k-nearest neighbor (KNN) ML model that identifies the one or more relevant software modules.

14. The system of claim 9, wherein generating the incident matrix comprises for each respective incident report term in the plurality of incident report terms in the regularized incident report, applying a neural network model that takes the respective incident report term as input and that outputs a similarity value for each term in the predetermined term set.

15. The system of claim 9, wherein the plurality of terms in the predetermined term set comprise a plurality of predefined terms, and wherein generating the incident vector comprises for each respective predefined term in the plurality of predefined terms:

for each respective combination of the respective predefined term and an incident report term in the regularized incident report, determining an intermediate value for the respective combination based on a similarity value for the respective combination and the importance measure for the incident report term;

calculating a cumulative value for the respective predefined term as a sum of the intermediate values for combinations of the respective predefined terms and the incident report terms; and including the cumulative value for the respective predefined term in the incident vector.

16. One or more non-transitory computer-readable storage media comprising processor-executable instructions that, when executed by one or more processors, cause the one or more processors to perform operations comprising:

storing a corpus of software support records;

receiving an incident report comprising a textual description of an incident involving a software system;

generating a regularized incident report in which out-of-vocabulary terms in the received incident report are replaced with in-vocabulary terms;

determining importance measures for a plurality of incident report terms, wherein each of the incident report terms is in the regularized incident report, wherein determining the importance measures includes weighting parts of speech of the regularized incident report, and wherein the importance measures are determined based on weightings of the parts of speech;

generating an incident matrix in which similarity values are defined for combinations of incident report terms in the incident report and terms in a predetermined term set;

generating an incident vector based on the incident matrix and the importance measures for the incident report terms in the incident report;

applying one or more machine learning (ML) models that identify, based on the incident vector, relevant software support records in the corpus of software support records, wherein the relevant software support records are potentially relevant to the incident;

identifying a cluster of neighboring incident report vectors in an n-dimensional space of a plurality of neighboring incident vectors that each correspond to an incident report for a software module;

determining relevant software modules based on the identification of the cluster of the neighboring incident report vectors; and outputting data identifying the relevant software support records and the relevant software modules.

17. The one or more non-transitory computer-readable storage media of claim 16, wherein generating the incident matrix comprises for each respective incident report term in the plurality of incident report terms in the regularized incident report, applying one or more neural network models that take the respective incident report term as input and that output a similarity value for each term in the predetermined term set, wherein the plurality of terms in the predetermined term set comprises a plurality of predefined terms, and wherein generating the incident vector comprises for each respective predefined term in the plurality of predefined terms:

for each respective combination of the respective predefined term and an incident report term in the regularized incident report, determining an intermediate value for the respective combination based on a similarity value for the respective combination and the importance measure for the incident report term;

calculating a cumulative value for the respective predefined term as a sum of the intermediate values for combinations of the respective predefined terms and the incident report terms; and including the cumulative value for the respective predefined term in the incident vector.

* * * * *